Feb. 9, 1960 N. E. NILSSON ET AL 2,924,664
AUTOMATIC TELEPHONE SYSTEM WITH AUTOMATIC TRANSFER SERVICE
Filed June 27, 1956
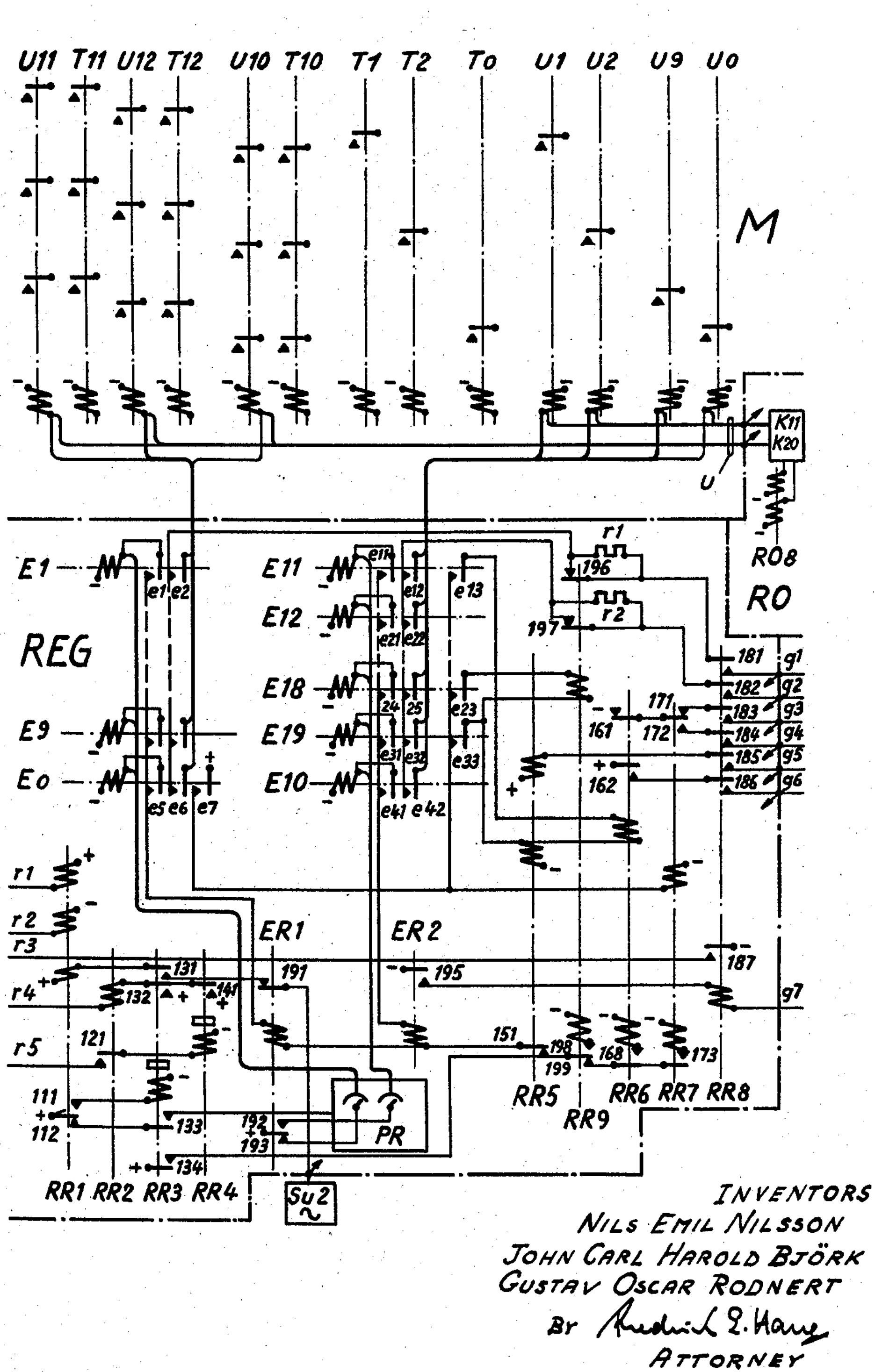
INVENTORS
NILS EMIL NILSSON
JOHN CARL HAROLD BJÖRK
GUSTAV OSCAR RODNERT
BY [signature]
ATTORNEY 2,924,664

AUTOMATIC TELEPHONE SYSTEM WITH AUTOMATIC TRANSFER SERVICE

Nils Emil Nilsson and John Carl Harold Björk, Stockholm, and Gustav Oscar Rodnert, Hagersten, Sweden, assignors to Telefonaktiebolaget L M Ericsson, Stockholm, Sweden, a corporation of Sweden Application June 27, 1956, Serial No. 594,275

Claims priority, application Sweden July 20, 1955

1 Claim. (Cl. 179—18)

The invention refers to a connecting device for automatic transfer service in such automatic telephone system, in which there are included registers and selectors and a marker for the setting of said selectors in accordance with the registration in said register, a multiple with groups of marking wires for marking the number of a called subscriber's line, a number of relay sets, each containing a first registering device for a telephone number, to which calls are to be transferred and a control device, which by means of said multiple controls and effects automatic transfer service, when there is a call to a subscriber who wishes transfer service.

In such telephone systems it is desirable to be able to call a certain subscriber's line in spite of the fact that the number of the subscriber's line is registered in a relay device and calls to the line therefore will be connected automatically to another telephone line. This problem is solved according to the invention by means of a relay in each of said registers, said relay being operated, when a certain direction number is registered in the register before the registration of the number of a subscriber's line, which by means of said first registering device in one of said switches is marked for transfer service and which relay, when operated, prevents said control device pertaining to the relay set from performing automatic transfer service.

The invention will be described below more in detail with reference to the annexed drawing which shows a circuit diagram for the register REG, said multiple *u* and a part of a relay set RO.

The register REG contains two digit registering relay sets E1—EO and E11—E10 and is intended for two-digit subscriber's numbers. There are provided relays RR1—RR4 for busy testing, holding and impulse receiving and a device PR for counting the number of impulses in the impulse series and for transmission of the corresponding digits to the relay sets E1—E0 and E11—E10. The relay RR8 is a relay for connecting the register to the marker M through the wires *g*1—*g*7 and the relays RR5—RR7 and RR9 register different direction digits. Common to all registers there are two groups of digit relays U1—U0, U11—U10 and T1—T0, T11—T10, which pertain to the marker M and to an identifier, respectively, and multiple wires *u*, which connect said relays with the registering device K11—K20 and the control device RO8 in a number of relay sets RO. The register REG operates said identifier through the wire *r*3 and the contact 187.

The register REG is marked busy by testing through the wire *r*5, the contact 121 and the relay RR4, which is slow-releasing and operates at the busy signal. The contact 141 closes a holding circuit for a call finder, pertaining to the register, through the wire on the relay RR2 and the wire *r*4. The relay RR2 attracts its armature and the contact 121 is actuated and thus the register is marked busy. During the release time for the relay RR4 the feeding relay RR1, which serves as an impulse relay, is operated, and so is the holding relay RR3, which is slow releasing and holds its armature during the impulse transmission. The contacts 111—112 and 131—134 are actuated. The calling person hears a buzzer tone, which is sent from the buzzer generator S*u*2 through the contacts 191 and 131 and is transformed between the windings of the relay RR1 to the subscriber's line, which is connected to the wires *r*1—*r*2. The subscriber sends impulse series, which through the contacts 112 and 133 are setting an impulse metering device, a selector or a relay chain, PR, which after each impulse series closes a circuit for registration of the digit, corresponding to the impulse series, in one of the relay sets E1—E0 and E11—E10 and which is then reset to receive the next impulse series.

Assuming that the call is directed to a subscriber's line, which is marked for transfer service in one of the relay sets RO, and that the calling person in spite of this, wishes to obtain a communication with said subscriber's line and not with the line to which the relay set is transferring. According to the invention this is achieved by means of a particular direction number, which here is supposed to be 08. The first impulse series then indicates the digit 0. A circuit is closed from +, the contact 193, the device PR, the winding on the relay E0, to minus. The relay E0 is operated and the contacts *e*5, *e*6 and *e*7 are actuated. When the device PR is reset the relay ER1 is operated in the following circuit: +, the contacts 134 and 151, the winding on the relay ER1, the contact *e*5, the winding on the relay E0, to minus. The contacts 191—193 are actuated. The buzzer tone is interrupted and the next impulse series, which corresponds to the digit 8, is registered on the relays E11—E10 through the following circuit, which is closed after the end of the second impulse series: +, the contact 192, the device PR, the winding on the relay E18, to minus. The contacts *e*23—*e*25 are closed. The following circuit is closed: +, the contacts *e*7 and *e*23, the upper winding of the relay PR9, the lower winding of the relay RR5, to minus. The relays RR9 and RR5 are operated. The contacts 151 and 196—199 are actuated. The contact 151 breaks the holding circuit of the relays E0, ER1, E18, ER2, which release their armatures whereby the registering devices E1—E0 and E11—E10 are released. The contact 198 closes a holding circuit for the relay RR9 through the lower winding of the relay and thus this relay is held and takes over the registering of the direction digit 08. The subscriber hears again the buzzer tone from the buzzer generator S*u*2.

Then the subscriber dials the number of the called subscriber's line, e.g. 12, on his dial. The number is registered by operation of the relays E1 and E12 and ER1—ER2. The contacts *e*1—*e*2, *e*11—*e*13 and 191—193 and 195 are actuated. If the marker M is free, the relay RR8 is operated. The contacts 181—187 are actuated. From the marker + is connected to the wires *g*1 and *g*2, which is described more closely in the patent application No. 2914/54. Two circuits are completed: +, the wire *g*1, the contact 181, the resistance *r*1, the contact *e*2, the winding on the relay U11, to minus and: +, the wire *g*2, the contact 182, the resistance *r*2, the contact *e*12, the winding on the relay U2, to minus. The registering device K11—K20 in the relay set RO is supposed to hold the winding of the relay RO8 connected parallel to the winding of the relay U11 and U2, respectively. The windings of the relay RO8 co-operate and if both the windings are connected simultaneously between + and minus, the relay RO8 is operated and makes transfer. As in this case the relay RR9 is operated the resistances *r*1 and *r*2 are connected, and thus the voltage of the windings of the relay RO8 is reduced so that the relay cannot operate. The relays U11 and U2 are so dimensioned that they operate in spite of the voltage drop over the resistances r1 and r2, respectively. The register REG will then set up a communication between the calling subscriber's line and the called subscriber's line by means of the marker M in spite of the last mentioned subscriber's line being marked for transfer service.

We claim:

In an automatic telephone system with automatic transfer service, in combination, subscriber's lines, selectors, registers, a marker, means connecting said registers one at a time to said marker, groups of marking conductors for marking the telephone number of a called line from the respective register connected to the marker, a number of relay sets, means operated when a register, which by a call has registered a directive number, is connected to the marker, said means, when operated, connecting an idle one of said relay sets to said marking conductors, each of said relay sets including registering means for a telephone number to which calls are transferred and registering means for a telephone number which is to be marked for automatic transfer service, a relay in the marker, control means which after the relay set has been connected to said marking conductors by a call to said directive number controls said marker relay when there is a call to that telephone number registered in the relay set which is marked for automatic transfer service, circuits in the marker switched by said marker relay for setting up a communication over said selectors to the other number registered in the relay set instead of to the called number marked for automatic transfer service, and relay means in each of said registers, each of said relay means being operated in response to the registration of a certain directive number in the respective register prior to the registration of the number of a subscriber's line which is marked for transfer service, said relay means, when operated, blocking automatic transfer service.

References Cited in the file of this patent

UNITED STATES PATENTS

| | | |
|---|---|---|
| 1,772,713 | Friendly | Aug. 12, 1930 |
| 2,341,693 | Clay | Feb. 15, 1944 |
| 2,788,393 | Armstrong | Apr. 9, 1957 |